US012730405B2

(12) United States Patent
Park

(10) Patent No.: US 12,730,405 B2
(45) Date of Patent: Sep. 8, 2026

(54) PRINTING EQUIPMENT FOR METALLIC MATERIAL AND PRINTING METHOD USING SAME

(71) Applicant: POSCO CO., LTD, Pohang-si (KR)

(72) Inventor: Sun-Hong Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/577,815

(22) PCT Filed: Jul. 12, 2022

(86) PCT No.: PCT/KR2022/010078
§ 371 (c)(1),
(2) Date: Jan. 9, 2024

(87) PCT Pub. No.: WO2023/287144
PCT Pub. Date: Jan. 19, 2023

(65) Prior Publication Data

US 2024/0385563 A1 Nov. 21, 2024

(30) Foreign Application Priority Data

Jul. 12, 2021 (KR) ........................ 10-2021-0090916

(51) Int. Cl.
*G03G 15/00* (2006.01)
*G03G 15/01* (2006.01)
(Continued)

(52) U.S. Cl.
CPC ..... *G03G 15/6591* (2013.01); *G03G 15/0184* (2013.01); *G03G 15/1625* (2013.01);
(Continued)

(58) Field of Classification Search
CPC ........... G03G 15/6591; G03G 15/0184; G03G 15/1625; G03G 21/0011; G03G 21/0035;
(Continued)

(56) References Cited

U.S. PATENT DOCUMENTS 5,018,640 A 5/1991 Morofuji et al.
5,189,470 A * 2/1993 Matsuda ............ G03G 15/6588 399/68
(Continued)

FOREIGN PATENT DOCUMENTS

CN 1751883 A 3/2006
CN 207490004 U 6/2018
(Continued)

OTHER PUBLICATIONS

Extended European Search Report dated Oct. 15, 2024 issued in corresponding to European Patent Application No. 22842406.5. (Note: JPH 06-40005 A was previously submitted).
(Continued)

*Primary Examiner* — Sandra Brase
(74) *Attorney, Agent, or Firm* — Morgan Lewis & Bockius LLP

(57) ABSTRACT

The present invention relates to a technology for printing an image of a letter, a drawing, etc. on the surface of a metallic material and, specifically, to printing equipment and a printing method using same, which can stably print an image on the surface of a metallic material at high speed.

14 Claims, 7 Drawing Sheets

(51) Int. Cl.
*G03G 15/16* (2006.01)
*G03G 21/00* (2006.01)

(52) U.S. Cl.
CPC ..... *G03G 21/0011* (2013.01); *G03G 21/0035* (2013.01); *G03G 2215/0404* (2013.01); *G03G 2215/0409* (2013.01)

(58) Field of Classification Search
CPC ... G03G 2215/0404; G03G 2215/0409; G03G 15/161; G03G 15/165; G03G 15/6588; G03G 2215/1661
See application file for complete search history.

(56) References Cited

U.S. PATENT DOCUMENTS

| | | | | |
|---|---|---|---|---|
| 5,712,073 | A | 1/1998 | Katada et al. | |
| 9,442,442 | B1 * | 9/2016 | Hara | G03G 15/2046 |
| 2002/0034405 | A1 * | 3/2002 | Kayahara | G03G 15/161 399/302 |
| 2012/0070206 | A1 | 3/2012 | Tsukioka | |
| 2014/0147146 | A1 * | 5/2014 | Kobayashi | G03G 15/161 399/302 |
| 2017/0212444 | A1 | 7/2017 | Tazaki | |
| 2017/0357193 | A1 * | 12/2017 | Ochi | G03G 15/1665 |
| 2018/0267436 | A1 * | 9/2018 | Tokuyama | G03G 15/1675 |
| 2019/0132958 | A1 | 5/2019 | Sharma et al. | |
| 2020/0301328 | A1 * | 9/2020 | Kabata | G03G 15/6591 |

FOREIGN PATENT DOCUMENTS

| | | | |
|---|---|---|---|
| CN | 111867840 | A | 10/2020 |
| EP | 0718719 | A1 | 6/1996 |
| GB | 1312574 | A | 4/1973 |
| JP | H01-163092 | A | 6/1989 |
| JP | H06-035239 | A | 2/1994 |
| JP | H06-40005 | A | 2/1994 |
| JP | H06-51573 | A | 2/1994 |
| JP | H08-292614 | A | 11/1996 |
| JP | H09-274356 | A | 10/1997 |
| JP | H10-151776 | A | 6/1998 |
| JP | 2002-258668 | A | 9/2002 |
| JP | 2005-017424 | A | 1/2005 |
| JP | 2007-003880 | A | 1/2007 |
| JP | 2007003880 | * | 1/2007 |
| JP | 2012-063623 | A | 3/2012 |
| JP | 5264321 | B2 | 8/2013 |
| JP | 2017-090699 | A | 5/2017 |
| JP | 2017-111227 | A | 6/2017 |
| JP | 2017-129764 | A | 7/2017 |
| KR | 10-1999-0012692 | A | 2/1999 |
| KR | 10-0197361 | B1 | 6/1999 |
| KR | 20-0332721 | Y1 | 11/2003 |
| KR | 10-2017-0075932 | A | 7/2017 |
| KR | 10-2018-0015783 | A | 2/2018 |

OTHER PUBLICATIONS

International Search Report dated Oct. 7, 2022, issued in International Patent Application No. PCT/KR2022/010078 (with English translation).
Office Action dated Feb. 18, 2025, issued in corresponding Japanese Patent Application No. 2024-500381 with an English translation.
Office Action dated Jun. 10, 2025, issued in corresponding Japanese Patent Application No. 2024-500381, with an English translation.
Office Action dated Jan. 29, 2026 issued in the corresponding Chinese Patent Application No. 202280048841.2 with the English translation. (Note: JPH 06-040005 A, and KR 20-0332721 Y1 already submitted.).

* cited by examiner

[FIG. 2]

[FIG. 7]
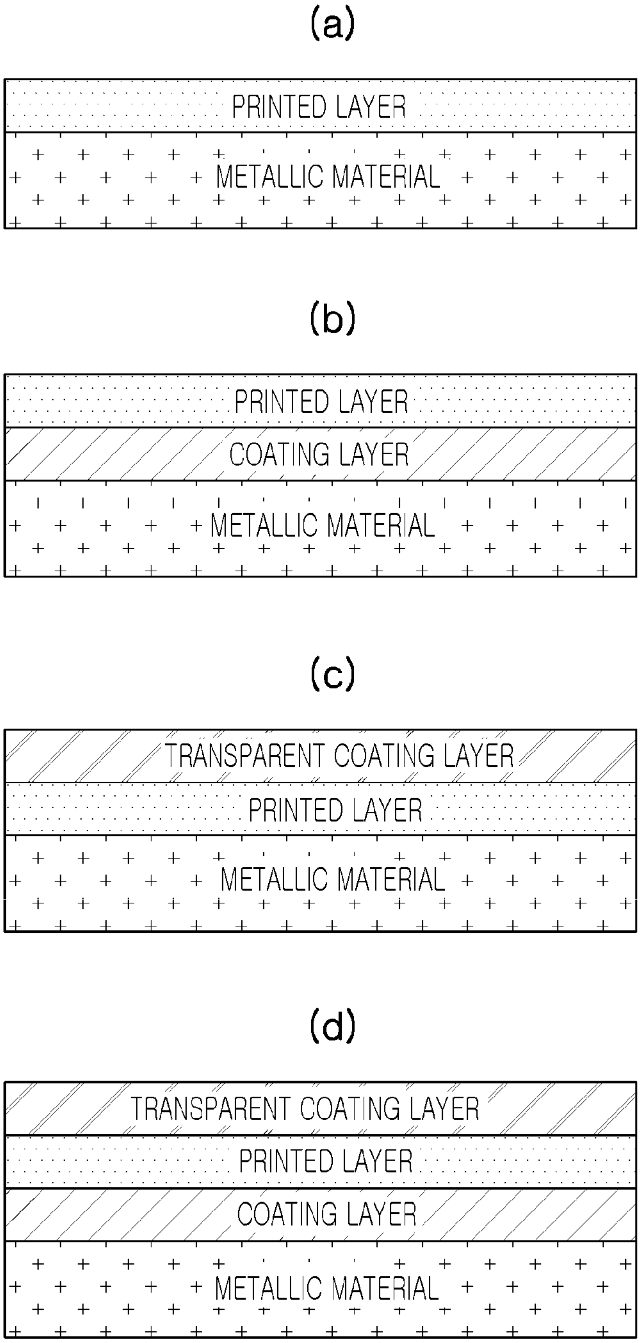

PRINTING EQUIPMENT FOR METALLIC MATERIAL AND PRINTING METHOD USING SAME

CROSS-REFERENCE OF RELATED APPLICATIONS

This application is the U.S. National Phase under 35 U.S.C. § 371 of International Patent Application No. PCT/KR2022/010078, filed on Jul. 12, 2022, which in turn claims the benefit of Korean Application No. 10-2021-0090916, filed on Jul. 12, 2021, the disclosure of which applications are incorporated by reference herein.

TECHNICAL FIELD

The present disclosure relates to a printing device for printing images, such as letters and pictures, on a surface of a metallic material, such as a steel sheet, and a printing method using the same.

BACKGROUND ART

Methods for printing images, such as letters and pictures, on the surface of metallic materials include a polymer transfer method, a roll transfer method, and an inkjet spray printing method.

In the polymer transfer method, an image film in the form of a sheet is output and an image is transferred to the surface of metal in a manner of thermal transfer or chemical transfer. The method of transferring images to a metal surface using a film is free to output on a film, but a manufacturing speed is slow as the film is transferred to a steel sheet, and the image attached to the metal surface in the form of a film may change depending on temperature or weather.

The roll transfer method is a method of forming a certain pattern on a surface of a roll and transferring an image to a surface of a metallic material in a roll-to-roll manner. However, the transferred images are limited to repetitive images, and in order to use the roll transfer method, a roll with each image patterned thereon should be prepared, making it difficult to prepare a patterned roll each time for various images.

The inkjet spray printing method is a method of printing images or letters on the surface of a metallic material using liquid ink including pigment and polymer resin. The inkjet spray printing method has a problem in that the surface of the metallic material should be plasma-treated or surface roughness should be controlled so that liquid may be easily adsorbed onto the surface of the steel sheet in using liquid ink. In addition, since the inkjet spray printing method uses liquid ink, a nozzle through which ink is sprayed may be clogged, requiring not only nozzle management but also periodic cleaning and replacement of the nozzle. In addition, since liquid ink is used, stabilization after ink spraying is essential, and it is difficult to manufacture using the roll-to-roll method and its use is limited to a batch type. In particular, inkjet spray printing materials have a form in which liquid polymers are connected and pigment forms an image therein, so there may be a problem in that the printed image may peel off in the case of bending or cutting.

Recently, metallic materials have been used in various fields, and images, such as letters and pictures, have been increasingly applied to metal surfaces in many cases. However, the existing image printing method is a method of printing images on the surface of paper or polymer materials, and there are technical and production limitations in applying images to the surface of metallic materials. Therefore, there is a need for a method to solve the limitations of the conventional printing method.

SUMMARY OF INVENTION

Technical Problem

An aspect of the present disclosure is to provide a printing device capable of stably printing images on the surface of a metallic material at a high speed and a printing method using the same, as technology for printing images, such as letters and pictures, on the surface of a metallic material.

In addition, an aspect of the present disclosure is to improve lifespan and printing yield of a photosensitive drum by avoiding direct contact between a metallic material and the photosensitive drum during a printing process of a metallic material.

The object of the present disclosure is not limited to the above-mentioned matters. Additional objects of the present disclosure are described throughout the specification, and those skilled in the art may not have any difficulty in understanding the additional objects of the present disclosure from the description given in the specification of the present disclosure.

Solution to Problem

According to an aspect of the present disclosure, a printing device for a metallic material includes: a transfer belt 800, which is in close contact with a continuously moving metallic material 100 and rotates in one direction, transferring a toner T attached to a surface thereof to a surface of a metallic material 100 to be settled thereon;

- a photosensitive drum 300, which is in close contact with the transfer belt 800 and rotates in a direction, opposite to the transfer belt 800, transferring the toner T attached to a surface thereof to a surface of the transfer belt 800;
- a developing unit 500 provided on one side of the photosensitive drum 300 and providing the toner T to the surface of the photosensitive drum 300;
- a photosensitive drum charging unit 410 charging the surface of the photosensitive drum 300 before the toner T is provided;
- an exposure unit 200 applying light energy to the surface of the photosensitive drum 300 between the developing unit 500 and the photosensitive drum charging unit 410 according to a required image;
- a metallic material charging unit 101 charging the surface of the metallic material 100 so that the toner T attached to the surface of the transfer belt 800 is delivered to the surface of the metallic material 100;
- a removal unit 600 removing the toner T remaining on the surface of the photosensitive drum 300 after the toner T is settled on the surface of the metallic material 100;
- a photosensitive drum discharging unit 420 removing the charge from the photosensitive drum 300 after removing the toner T; and
- a fixing unit 700 located at a rear end of the transfer belt 800
- to fix the toner T settled on the surface of the metallic material 100.

According to another aspect of the present disclosure, a printing method for a metallic material includes a charging operation of charging a surface of a photosensitive drum 300 rotating in one direction;

- an exposure operation of applying light energy to the surface of the charged photosensitive drum 300 according to a required image;
- a developing operation of providing toner T to the surface of the photosensitive drum 300 after the exposure;
- moving the toner attached to the surface of the photosensitive drum 300 to a surface of the charged transfer belt 800;
- a transfer operation of continuously moving the toner attached to the surface of the transfer belt 800 and moving the toner to a surface of a charged metallic material 100 to settle the toner thereon;
- a fixing operation of fixing the toner settled on the surface of the metallic material 100;
- a removal operation of removing the toner remaining on the surfaces of the photosensitive drum 300 and the transfer belt 800 after the transfer; and
- a discharging operation of discharging
- the surfaces of the photosensitive drum 300 and the transfer belt 800.

Advantageous Effects of Invention

According to the present disclosure, technology capable of stably printing images, such as letters and pictures, on materials, such as metal, may be provided, and production efficiency of products may be improved by continuously manufacturing products. In addition, high value-added products may be manufactured by easily forming diverse and colorful images.

Moreover, according to the present disclosure, by preventing direct contact between metallic materials and the photosensitive drum, damage to and wear of the photosensitive drum may be minimized, thereby reducing repair efforts for the photosensitive drum and improving lifespan of the photosensitive drum.

The various and beneficial advantages and effects of the present disclosure are not limited to the aforementioned contents and may be more easily understood through description of specific exemplary embodiments of the present disclosure.

BRIEF DESCRIPTION OF DRAWINGS

FIG. 7 is a schematic diagram schematically illustrating a cross-section of a printed metallic material of the present disclosure.

BEST MODE FOR INVENTION

The terms used in this specification are for describing the present disclosure and are not intended to limit the present disclosure. In addition, as used herein, singular forms include plural forms unless the relevant definition clearly indicates to the contrary.

The meaning of "including" used in the specification specifies a component and does not exclude the presence or addition of another component.

Unless otherwise defined, all terms, including technical and scientific terms, used in this specification have the same meaning as commonly understood by the person skilled in the art to which the present disclosure pertains. Terms defined in the dictionary are interpreted to have meanings consistent with related technical document and present disclosure.

Generally known laser or LED printers are used to print on flexible objects, such as paper, but the present disclosure relates to technology for printing images on metallic materials. The present disclosure uses a charging unit, a photosensitive drum, a fused roll, etc. to print images on the surface of a continuously moving metallic material in a roll-to-roll manner. The present disclosure relates to technology using a transfer belt to prevent the surface of a photosensitive drum from being damaged by frictional contact between the photosensitive drum and the metallic material when the metallic material has high hardness.

Hereinafter, exemplary embodiments of the present disclosure will be described with reference to the drawings. The exemplary embodiments of the present disclosure may be modified in various forms, should not be construed as being limited to the drawings and the exemplary embodiments described below, and are described in detail to those skilled in the art to which the present disclosure pertains.

Figure 1:
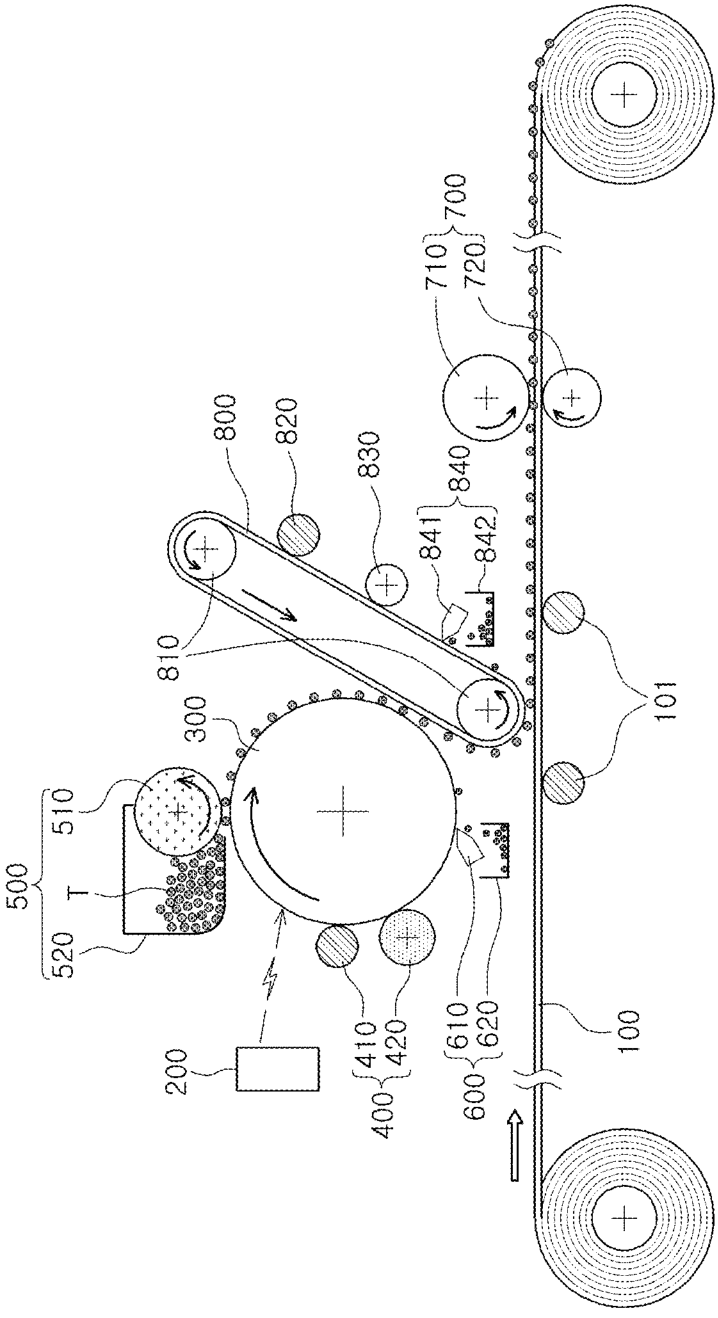
FIG. 1 is a schematic diagram schematically illustrating an exemplary embodiment of a printing device of the present disclosure.

FIG. 1 schematically illustrates an exemplary embodiment of a printing device of the present disclosure. Referring to FIG. 1, the printing device of the present disclosure relates to technology for printing an image on the surface of a continuously moving metallic material 100 using a roll to roll method. The image refers to letters, shapes, pictures, etc., and includes various colors and forms, such as monochromatic, achromatic, and chromatic colors, or three-dimensional form.

The printing device of the present disclosure includes a transfer belt 800, a photosensitive drum 300, a photosensitive drum charging and discharging unit 400, an exposure unit 200, a developing unit 500, a removal unit 600, a fixing unit 700, etc. Hereinafter, each component will be described in detail.

The transfer belt 800, rotating in one direction, while in close contact with a metallic material 100, serves to deliver a toner attached to the surface thereof to the surface of the metallic material 100 to be fixed thereon, and, at the same time, protect the surface of the photosensitive drum 300 and improve the quality of the image. If hardness of the metallic material 100 is high, the surface of the photosensitive drum 300 may be damaged due to contact between the metallic material 100 and the photosensitive drum 300. In this case, repair and replacement costs for the photosensitive drum 300 may increase and the accuracy of the transferred image may also deteriorate, thereby deteriorating print quality. Therefore, the present disclosure adopts a method in which toner does not move from the photosensitive drum 300 to the metallic material 100, but an image is transferred via the transfer belt 800.

Meanwhile, a transfer belt drive roll 810 is provided to drive the transfer belt 800 in a moving direction, and in order to receive a toner T, a transfer belt charging unit 820 is provided to charge the surface of the transfer belt 800 before the toner T is provided from the photosensitive drum 300, and a corona wire is commonly used. Meanwhile, a toner removal unit 840 is provided to remove the toner T remaining on the transfer belt after the toner T of the transfer belt 800 is delivered to the metallic material 100 to transfer the image, and a transfer belt discharging unit 830 may be provided to discharge the charge on the transfer belt after the toner T is removed.

The photosensitive drum 300, rotating in the opposite direction, while in contact with the transfer belt, serves to transfer the toner T attached to the surface thereof to the transfer belt 800. The photosensitive drum 300 may be a photosensitive drum commonly used in the art to which the present disclosure pertains and is not particularly limited in type. For example, an organic photo conductor (OPC) drum may be used.

The developing unit 500 is provided on one side of the photosensitive drum 300 and provides the toner T for forming an image on the surface. The developing unit 500 may be any developing unit that may provide toner to the photosensitive drum 300 and is not particularly limited in form or shape. In FIG. 1, as a preferred example, the developing unit 500 includes a toner container 520 including the toner T and a developing roller 510 delivering the toner from the toner container 520 to the photosensitive drum 300. The developing roller 510 is not essential, and in some cases, the toner may be provided directly from the toner container 520 to the photosensitive drum 300. Meanwhile, the toner T forms an image on the surface of a metallic material, and any toner known to a person skilled in the art to which the present disclosure pertains may be used, without being limited in type. For example, a material having a polymer structure may be used. In addition, in the present disclosure, materials that may provide various functions (e.g., fluorescent materials, magnetic materials, electrically conductive materials, etc.) may be added to the toner, and not only may an image with a function be implemented, but roughness may be given or a three-dimensional shape may be implemented by using various particles of the toner.

A photosensitive drum charging unit 410 charging the surface of the photosensitive drum 300 before the toner T is provided may be provided. The photosensitive drum charging unit 410 applies electrostatic charge to the surface of the photosensitive drum. As the charging unit, a corona wire is commonly used.

Figure 2:
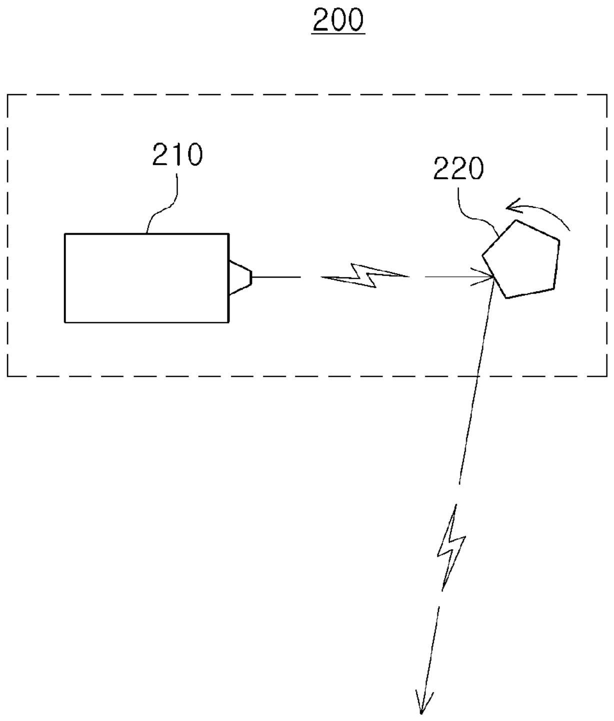
FIG. 2 is a schematic diagram specifically illustrating an example of a laser exposure unit in the printing device of the present disclosure.

An exposure unit 200 applying light energy to the charged surface of the photosensitive drum 300 between the developing unit 500 and the photosensitive drum charging unit 410 according to a required image is provided. The position of the exposure unit 200 is not important, but the light energy is given to the surface of the photosensitive drum 300 between the developing unit 500 and the photosensitive drum charging unit 410. Due to the light energy, some charges are removed from the surface of the photosensitive drum 300, and the toner is attached to the surface of the photosensitive drum 300 by the developing unit 500. The light energy is preferably a laser or a light emitting diode (LED). FIG. 2 schematically illustrates the exposure unit 200 in the case of using the laser. A scanning mirror 220 removing charges by scanning according to the image required for the surface of the photosensitive drum 300 by regulating the laser generating unit 210 and the laser emitted from the laser generating unit 210 may be provided.

A metal material charging unit 101 charging the surface of the metallic material 100 may be provided so that the image forming toner T delivered from the photosensitive drum 300 to the transfer belt 800 may move to and settle on the continuously moving metallic material 100. The metallic material charging unit 101 not only serves to charge the metallic material with a certain electric charge, but also serves as a guide roll to help the metallic material move at a constant speed. One or more metallic material charging unit 101 may be provided, and the metallic material charging unit 101 may be located at the front, rear, or front and rear of the transfer belt 800 based on a moving direction of the metallic material 100 and may be located at the top, bottom, or both top and bottom of the metallic material 100.

Even if there are two or more metallic material charging unit 101, they do not play different roles and there is an advantage in that stronger electrostatic attraction may be secured through charging two or more times.

Figure 3:
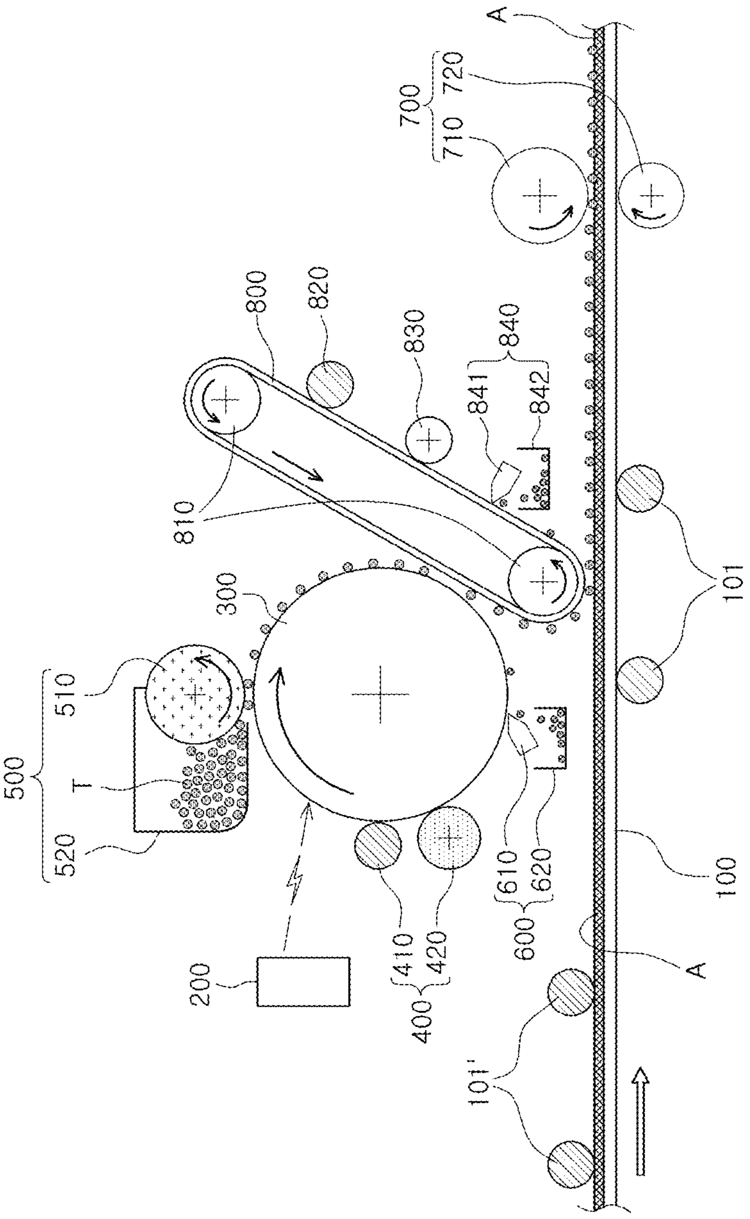
FIG. 3 is a schematic diagram schematically illustrating another exemplary embodiment of the printing device of the present disclosure.

Meanwhile, FIG. 3 illustrates another exemplary embodiment in the present disclosure. As shown in FIG. 3, a separate coating layer (A), for example, a resin layer, etc. may be formed on the surface of the metallic material 100, and in the case of printing on the coating layer, a metallic material charging unit 101' for charging the coating layer (A) may be located on the coating layer A.

The photosensitive drum 300 includes the removal unit 600 removing the toner T remaining on the surface after providing the toner on the surface thereof to the transfer belt 800. The removal unit 600 may include a blade 610 separating the remaining toner on the surface of the photosensitive drum 300 and a collection bin 620 for collecting the separated toner at a lower end of the blade 610 to prevent the separated toner from falling to the metallic material 100 and deteriorating printing quality.

Meanwhile, such removal unit may also be provided in the transfer belt 800. That is, after setting the toner T for image formation on the metallic material 100, in order to remove the toner T remaining on the surface of the transfer belt 800, a blade 841 and a collection bin 829 842 of collecting the separated toner at the lower end of the blade 841 to prevent the separated toner from falling to the metallic material 100 and deteriorating printing quality may be provided.

Figure 4:
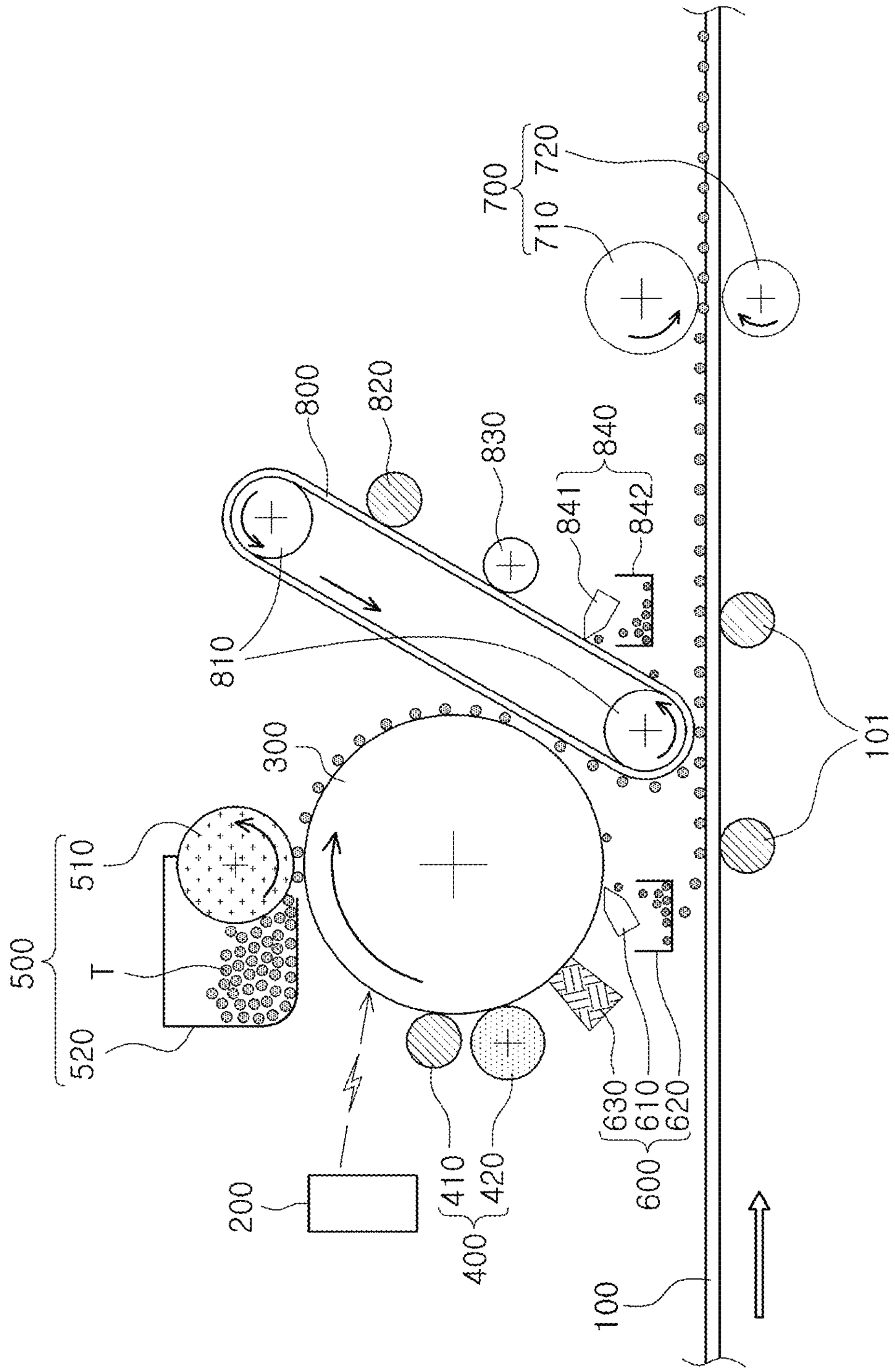
FIG. 4 is a schematic diagram schematically illustrating another exemplary embodiment of the printing device of the present disclosure.

FIG. 4 schematically illustrates another exemplary embodiment of the printing device of the present disclosure. In the printing device shown in FIG. 4, the removal unit 600 removing the toner remaining on the surface of the photosensitive drum 300 after the toner T of the photosensitive drum 300 moves to the surface of the transfer belt 800 is realized, and an alcohol brush 630, in addition to the blade 610 and the collection bin 620 described above, may be further included. The photosensitive drum 300 rotates at high speed and transfers an image, so there are cases in which it is not easy to remove the toner. In this case, there is a problem that an afterimage of the image may remain. To this end, after primary removal with the blade 610, secondary removal may be performed by a chemical method using an alcohol brush or the like. Meanwhile, the alcohol brush for chemical removal may be equally applied to the transfer belt 800.

A fixing unit 700 may be provided at the rear of the photosensitive drum 300 and the transfer belt 800 based on the moving direction of the metallic material 100 to fix the toner T on the metallic material 100 to stably form an image. The fixing unit 700 may include a fused roll 710 applying heat to the toner T to fix the toner T settled on the metallic material 100 and a pressure roll 720 applying pressure to help fix the toner T. At this time, a heating temperature of the fused roll 710 is preferably 25 to 400° C.

In the present disclosure, it is more preferable that the metallic material charging unit 101 and the pressure roll 720 have a structure capable of moving up and down. The metallic material 100 may not always have a constant thickness and may be a very thin film or a thick plate. Therefore, if the metallic material charging unit 101 and the pressure roll 720 may be moved up and down depending on the thickness of the metallic material 100, an image may be printed regardless of the thickness of the metallic material 100.

Figure 5:
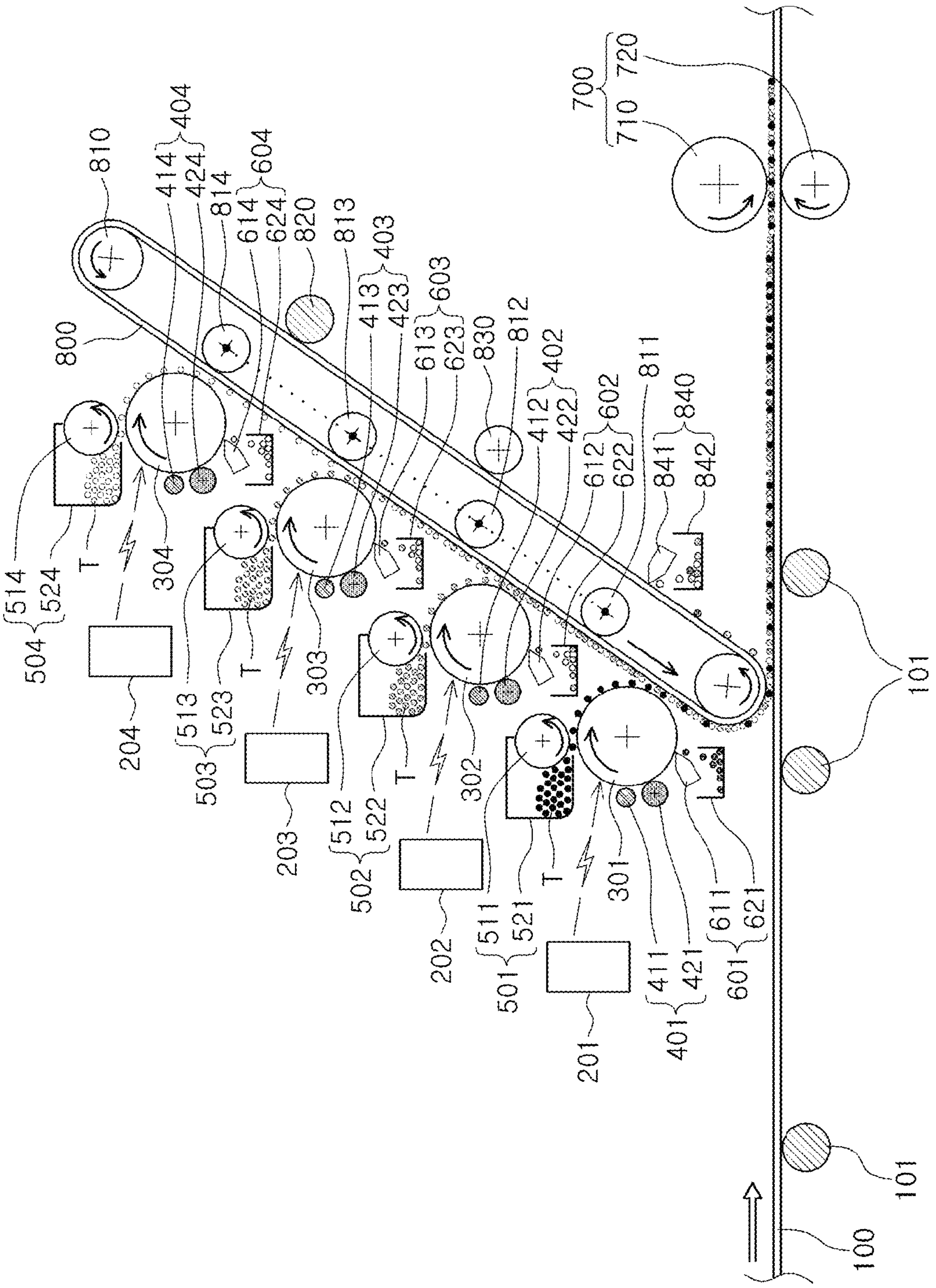
FIG. 5 is a schematic diagram schematically illustrating another exemplary embodiment of the printing device of the present disclosure.

Meanwhile, one or more toners may be used to print various images, and in this case, two or more photosensitive drums, two or more photosensitive drum charging units, two or more photosensitive drum discharging units, two or more exposure units, two or more developing units, and two or more removal units may be provided in pairs in the moving direction of the transfer belt 800. FIG. 5 schematically illustrates another exemplary embodiment of the printing device of the present disclosure. FIG. 5 illustrates a printing device for transferring an image by providing four types of toners in order to print a color image. The four types of toners may be C (Cyan), Y (Yellow), and M (Magenta), and K (Black). The four types of toners may not be necessarily used, and may include W (White). Some of these may be used, and the order is not set. A person skilled in the art may arbitrarily select one considering a required image, work efficiency, etc. However, the white (W) toner may be placed at the front in the direction of the metallic material.

FIG. 5 illustrates a printing device in the case of using four types of toners. Accordingly, in FIG. 5, in order to settle the four types of toners on the metallic material 100, four pairs of photosensitive drums 301, 302, 303, and 304, photosensitive drum charging and discharging unit 401, 402, 403, and 404, exposure units 201, 202, 203, and 204, developing units 501, 502, 503, and 504, and removal units 601, 602, 603, and 604 may be located in the moving direction of the transfer belt. Accordingly, as shown in FIG. 5, the toner T transferred by each pair may be delivered to one transfer belt 800, and the transfer belt 800 settles the toner T again on the metallic material 100. In addition, at this time, the fixing unit 700 for fixing the toner settled on the metallic material 100 is for fixing the final transferred image, and does not necessarily need to be multiple.

Meanwhile, as shown in FIG. 5, in the case of using multiple photosensitive drums, the length of the transfer belt 800 may increase, which may cause sagging. Therefore, transfer belt support rolls 811, 812, 813, and 814 that promote continuous movement, while supporting the transfer belt 800, may be further provided.

Figure 6:
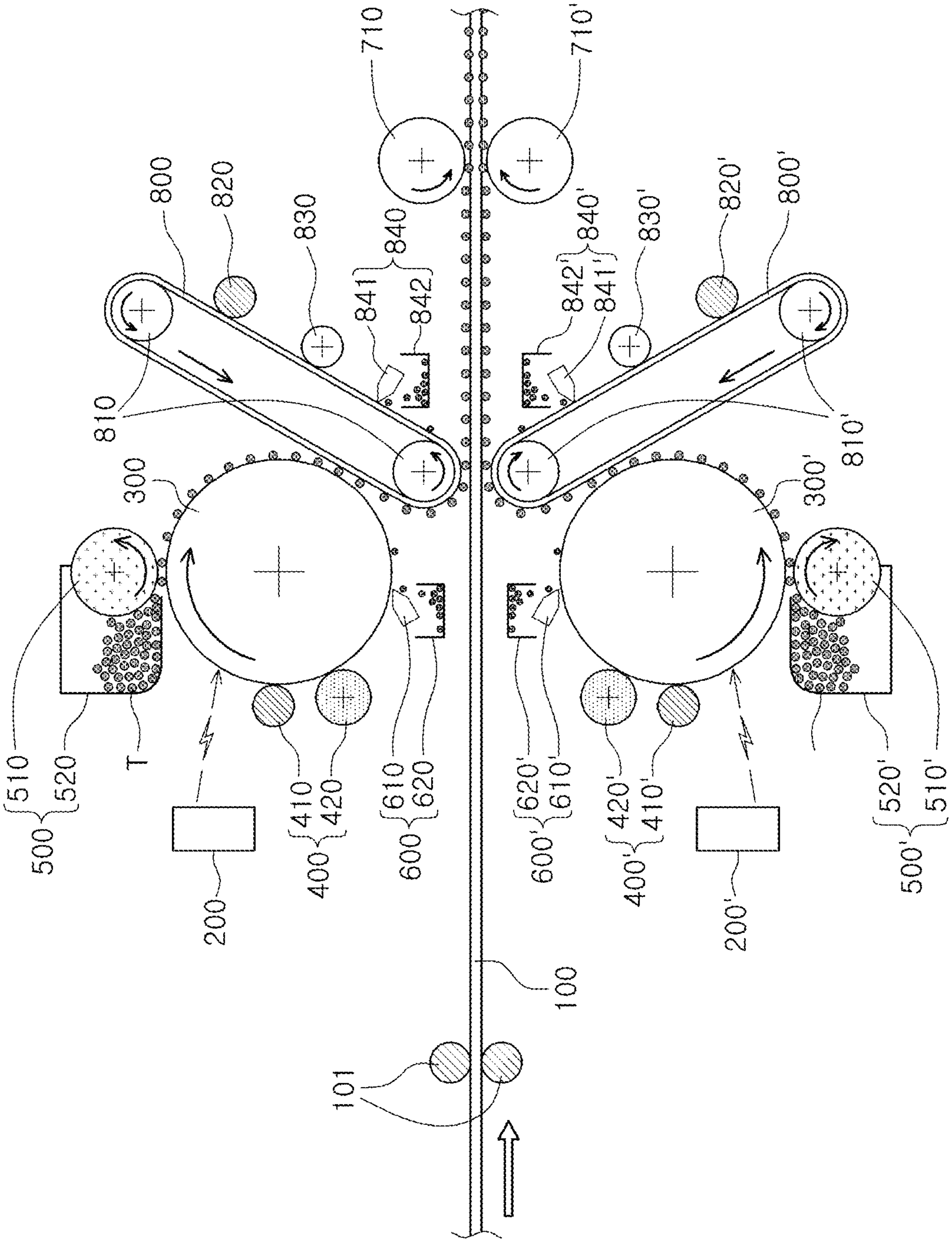
FIG. 6 is a schematic diagram schematically illustrating another exemplary embodiment of the printing device of the present disclosure.

FIG. 6 illustrates another exemplary embodiment in the present disclosure. FIG. 6 relates to the aforementioned printing device which may sequentially or simultaneously print both sides of the continuously moving metallic material 100, and illustrates the above-described printing device located above and below the metallic material. In other words, technology that each component having the functions and roles described above are provided above and below the metallic material to print both front and back sides of the metallic material.

Hereinafter, a metallic material printing method of the present disclosure will be described in detail. The printing method of the present disclosure will be described with reference to the drawings described above.

In the present disclosure, in the printing method for printing an image on the surface of the continuously moving metallic material 100, first, a surface of a photosensitive drum 300 rotating in one direction is charged. Through this, a charge layer is formed on the photosensitive drum 300 with a certain charge, and then it is prepared to apply an image using the toner T. The surface of the photosensitive drum 300 may have either a positive (+) or negative (−) charge.

Exposure is performed to provide light energy to the surface of the charged photosensitive drum 300 by forming the charge layer. By removing the charge on the surface of the photosensitive drum 300, the toner may be moved on the surface of the photosensitive drum 300 according to a required image. The light energy may be in various forms, and it is preferable to use a laser or LED light source.

The toner is attached to the exposed surface of the photosensitive drum 300. This is called the development stage. The toner is charged with a charge opposite to that of the photosensitive drum 300 and adheres to the surface of the photosensitive drum 300. In the developing operation, referring to the example of FIG. 1, the developing roller 510 transfers a certain amount of toner T from the toner container 520 to the photosensitive drum 300. However, the developing roller 510 may not be necessary, and the toner T may be moved directly from the toner container 520 to the photosensitive drum 300. That is, the developing operation is a process in which the toner is attached to the position from which the charge was removed from the surface of the photosensitive drum 300.

Thereafter, the toner attached to the surface of the photosensitive drum 300 moves to the charged transfer belt 800, thereby moving the toner to the surface of the transfer belt 800. At this time, the surface of the transfer belt 800 is charged with a charge opposite to that of the toner, so the toner is attracted and moved to the surface of the transfer belt 800. By using the transfer belt 800, it is possible to avoid direct contact of the photosensitive drum 300 with the metallic material 100. In particular, in order to prevent the surface of the photosensitive drum from being damaged in the case of using a metallic material with high hardness, the toner T on the surface of the photosensitive drum 300 is first moved to the transfer belt 800.

As described above, a transfer operation is performed in which the toner attached to the surface of the transfer belt 800 moves to the continuously moving charged metallic material 100 and settled on the surface of the metallic material 100. The metallic material 100 is charged with the same charge as that of the transfer belt 800 and is charged with a charge opposite to the toner, so that the toner on the transfer belt moves to the metallic material 100. The transfer operation is a process of printing an image on the surface of the metallic material 100, in which since the metallic material 100 is charged with a charge opposite to the toner, thereby attracting the toner and fixing the toner on the surface of the metallic material 100. Charging of the metallic material 100 may be performed before, after, or both before and after the transfer operation. Meanwhile, as shown in FIG. 3, when a separate coating layer (A) is formed on the surface of the metallic material 100 and printing is performed on the coating layer (A), a metallic material charging unit 101' may be additionally provided for the coating layer (A) to be charged.

The toner fixed on the surface of the metallic material 100 goes through a fixing operation, and the fixing operation may be performed by thermocompression. Specifically, the toner may be compressed at the same time when heat is applied by the fused roll 710 and the pressure roll 720. At this time, the heating temperature is preferably 25 to 400° C. As described above, the toner used in the present disclosure is used for printing metallic materials, and a main component thereof has a polymer structure. In particular, because metallic materials have a high heat transfer rate, it may be difficult to melt and adsorb the toner, so the toner should be heated to an appropriate temperature to be adsorbed. To this end, since the toner may be reacted at a temperature above room temperature and may be fixed to the surface of the metallic material, the heating temperature is preferably 25° C. or higher. Meanwhile, if the temperature exceeds 400° C., the polymer structure of the toner may decompose, so it is preferable that the heating temperature does not exceed 400° C. More preferably, the toner is heated to 50 to 300° C.

After the toner is moved to the transfer belt 800, a removal operation is performed to remove the toner remaining on the surface of the photosensitive drum 300 and the toner remaining on the surface of the transfer belt 800 after the toner is settled on the metal material 100. This is to prevent a deterioration of printing quality due to an afterimage that may remain in the follow-up printing process due to the toner remaining on the photosensitive drum 300 and the transfer belt 800. At this time, as shown in FIGS. 1 and 4, in the removal method, physical removal is performed through the blades 610 and 841, and the removed toner may be collected by the collection bins 620 and 842, thereby being prevented from falling onto the metallic material. Meanwhile, for more complete removal, chemical removal may be further performed using the alcohol brush 630 after the physical removal. Although not shown in the present disclosure, in some cases, the transfer belt may further include the alcohol brush.

Thereafter, in order to extinguish the charges remaining on the photosensitive drum 300 and the transfer belt 800, an operation of discharging the surfaces of the photosensitive drum 300 and the transfer belt 800 is performed. Through the discharge, the photosensitive drum 300 is prepared for new printing.

The printing method of the present disclosure may print a color image using various colors of toners T, such as W (White), C (Cyan), Y (Yellow), M (Magenta), and K (Black). At this time, printing may be performed using two or more toners, and in this case, as described above, two or more photosensitive drums, photosensitive drum charging units, photosensitive drum discharging units, exposure units, developing units, and removal units may be provided in pairs and are provided in the moving direction of the transfer belt, and as the charging operation, the exposure operation, the developing operation, the transfer operation, and the removal operation are performed twice or more times, printing may be performed in various colors. The order of the colors is not particularly limited in the present disclosure and may be determined a required image, work efficiency, etc.

An example of this is shown in FIG. 5. In FIG. 5, four pairs of photosensitive drums, a photosensitive drum charging unit, the photosensitive drum discharging units, the exposing units, the developing units, and the removal units are provided in four pairs and perform each operation to perform printing. Meanwhile, when the white toner is used at the forefront based on the moving direction of the metallic material, a white background image may be transferred first, which has the advantage of increasing the clarity of the overall image.

Meanwhile, as shown in FIG. 6, in order to print on both the front and rear sides of the metallic material, an image may be printed on both sides of the metallic material by sequentially or simultaneously applying the printing method of the present disclosure described above to both the front and rear sides of the metallic material.

Next, the printed metallic material obtained using the above printing device or printing method will be described in detail. FIG. 7 schematically illustrates the printed metallic material of the present disclosure, and the present disclosure will be described in detail with reference to FIG. 7.

The printed metallic material of the present disclosure includes a printed layer formed on the metallic material, as shown in FIG. 7(*a*). As described above, the metallic materials may include steel sheets, non-ferrous metals, and metal alloys, and are not limited in type.

The printed layer is preferably formed using the metallic material printing device or the metallic material printing method described above. That is, the printed layer is preferably formed using a printing device and a printing method using a laser, LED, etc. as an exposure unit.

The printed layer may form more diverse images compared to images formed on existing metallic materials. The printed layer has the advantage of not only having a clear shape and color compared to images formed by the existing printing methods, but also having excellent processing characteristics due to high resistance thereof to peeling. Existing printing methods include roll coating and inkjet coating using liquid pigments or dyes. This liquid type method uses transparent polymer resin (approximately 70-80 wt %) mixed with colored particles (approximately 20-30 wt %). In other words, since most of the pigments and dyes are transparent polymer resins, the shape or color is not clearly visible, and if liquid particles are large, the possibility of peeling due to stress applied to the entire polymer may increase, so the processing characteristics may be low. In contrast, the printed layer of the present disclosure uses the toner, which is a solid powder, and each particle of the powder corresponds to a unit particle including color, so excellent color may be formed. In addition, because existing printing methods use liquid pigments or dyes, they are significantly affected by a surface condition of the printed material. For example, in that printing quality is affected by the surface roughness or surface shape of the material, effort is required for pre-treatment of the surface, such as roughness management. However, the printing method using a laser, LED, etc. according to the present disclosure is a method in which toner powder is printed through an electrical adsorption and compression process, so an image may be formed more easily than the existing method.

Meanwhile, the printed metallic material of the present disclosure may further include a coating layer between the metallic material and the printed layer, as shown in FIG. 7(*b*). The coating layer may include a wet or dry plating layer, such as an electrogalvanized (EG) layer or a hot dip galvanized (GI) layer.

In addition, the coating layer may include a pretreatment layer formed on the plating layer, an intermediate coating layer formed on the pretreatment layer, and a top coating layer formed on the intermediate coating layer.

The pretreatment layer, the intermediate coating layer, and the top coating layer are not particularly limited in the present disclosure, and may include all those known in the art to which the present disclosure pertains. Hereinafter, a preferred example will be described.

The pretreatment layer is intended to improve adhesion between a base metal and the intermediate coating layer (a primer layer) and is usually formed within 1 μm, and a chromium-free (Cr-free) polymer coating, chromium hexavalent ($Cr6^{+}$), or chromium trivalent ($Cr^{3+}$) coating may be performed.

The intermediate coating layer (the primer layer) is for ensuring corrosion resistance and concealing a base layer, may have about 5 μm, and may be coated using polyester, urethane, epoxy, etc. However, the intermediate coating layer may be omitted depending on the purpose.

The top coating layer represents surface properties and is directly related to the physical properties of the product, and the printed layer is formed on the top coating layer. Accordingly, the top coating layer is intended for protection, color, and concealment when the surface is physically hit, and to this end, the top coating layer may have a thickness of 15 to 20 μm, and polyester, urethane, epoxy, etc. may be used.

Meanwhile, the printed metallic material of the present disclosure may further include a transparent coating layer on the printed layer, as shown in FIGS. 7(*c*) and 7(*d*). The transparent coating layer requires gloss or serves to protect the printed layer. The transparent coating layer is also not particularly limited in the present disclosure and may include all those known in the art to which the present disclosure pertains.

For example, the transparent coating layer is generally polymer-based, and polymer resins, as such polyester and urethane, may be used similar to the top coating layer, and in the case of outdoor use, a fluorine resin may be used. The transparent coating layer may be formed to have a thickness of about 1 to 5 μm depending on the purpose.

DESCRIPTION OF REFERENCE NUMERALS

100 . . . METALLIC MATERIAL
101, 101' . . . METALLIC MATERIAL CHARGING UNIT
200, 200', 201, 202, 203, 204 . . . EXPOSURE UNIT
210 . . . LASER GENERATING DEVICE
220 . . . SCANNING MIRROR
300, 300', 301, 302, 303, 304 . . . PHOTOSENSITIVE DRUM
400, 400', 401, 402, 403, 404 . . . PHOTOSENSITIVE DRUM CHARGING AND DISCHARGING UNIT
410, 410', 411, 412, 413, 414 . . . PHOTOSENSITIVE DRUM CHARGING UNIT
420, 420', 421, 422, 423, 424 . . . PHOTOSENSITIVE DRUM DISCHARGE UNIT
500, 500', 501, 502, 503, 504 . . . DEVELOPMENT UNIT
510, 510', 511, 512, 513, 514 . . . DEVELOPMENT ROLLER
520, 520', 521, 522, 523, 524 . . . TONER CONTAINER
600, 600', 601, 602, 603, 604 . . . REMOVAL UNIT
610, 610', 611, 612, 613, 614 . . . BLADE
620, 620', 621, 622, 623, 624 . . . COLLECTION BIN
630 . . . ALCOHOL BRUSH
700, 700' . . . FIXING UNIT
710, 710' . . . FUSED ROLL
720 . . . PRESSURE ROLL
800, 800' . . . TRANSFER BELT
810, 810' . . . TRANSFER BELT DRIVE ROLL
811, 812, 813, 814 . . . TRANSFER BELT SUPPORT ROLL
820, 820' . . . TRANSFER BELT CHARGING UNIT
830, 830' . . . TRANSFER BELT DISCHARGING UNIT
840, 840' . . . TRANSFER BELT TONER REMOVAL UNIT
841, 841' . . . TRANSFER BELT BLADE
842, 842' . . . TRANSFER BELT COLLECTION BIN

The invention claimed is:

1. A printing device for a metallic material, the printing device comprising:

a transfer belt, which is in close contact with a continuously moving metallic material and rotates in one direction, transferring a toner T attached to a surface thereof to a surface of a metallic material to be settled thereon;

a photosensitive drum, which is in close contact with the transfer belt and rotates in a direction, opposite to the transfer belt, transferring the toner T attached to a surface thereof to a surface of the transfer belt;

a developing unit provided on one side of the photosensitive drum and providing the toner T to the surface of the photosensitive drum;

a photosensitive drum charging unit charging the surface of the photosensitive drum before the toner T is provided;

an exposure unit applying light energy to the surface of the photosensitive drum according to a required image between the developing unit and the photosensitive drum charging unit;

a metallic material charging unit charging the surface of the metallic material so that the toner T attached to the surface of the transfer belt is delivered to the surface of the metallic material;

a removal unit removing the toner T remaining on the surface of the photosensitive drum after the toner T is settled on the surface of the metallic material;

a photosensitive drum discharging unit removing the charge from the photosensitive drum after removing the toner T; and a fixing unit located at a rear end of the transfer belt to fix the toner T settled on the surface of the metallic material, wherein the metallic material charging unit is included as two or more, and two or more metallic material charging units are provided both in front and rear ends of the photosensitive drum based on a moving direction of the metallic material or both above and below the metallic material, and the two or more metallic material charging units are configured to charge the metallic material to the same polarity.

2. The printing device of claim 1, wherein the printing device includes:

a transfer belt drive roll driving the transfer belt in a moving direction;

a transfer belt charging unit charging the transfer belt before receiving the toner T through the transfer belt;

a transfer belt toner removal unit removing the toner T remaining on the transfer belt after delivering the toner T to the metallic material; and a transfer belt discharging unit discharging the transfer belt after removing the toner T.

3. The printing device of claim 2, wherein the transfer belt toner removal unit includes a blade and a collection bin located at a lower end of the blade.

4. The printing device of claim 3, wherein when the light energy is a laser, the exposure unit includes a laser generating unit and a scanning mirror.

5. The printing device of claim 1, wherein the removal unit includes a blade and a collection bin located at a lower end of the blade.

6. The printing device of claim 5, wherein the removal unit further includes an alcohol brush between the blade and the collection bin.

7. The printing device of claim 1, wherein the light energy uses a laser or a light emitting diode (LED).

8. The printing device of claim 1, wherein the developing unit includes a toner T container and a developing roller providing the toner T of the toner T container to the photosensitive drum.

9. The printing device of claim 1, wherein the fixing unit includes a fused roll and a pressure roll.

10. The printing device of claim 1, wherein the photosensitive drum, the photosensitive drum charging unit, the photosensitive drum discharging unit, the exposure unit, the developing unit, and the removal unit are formed in pairs and are provided in two or more units according to a moving direction of the transfer belt, and each developing unit provides different colors of toners.

11. A printing method for a metallic material, the printing method comprising:

a charging operation of charging a surface of a photosensitive drum rotating in one direction;

an exposure operation of applying light energy to the surface of the charged photosensitive drum according to a required image;

a developing operation of providing toner T to the surface of the photosensitive drum after the exposure;

moving the toner attached to the surface of the photosensitive drum to a surface of a charged transfer belt;

a transfer operation of continuously moving the toner attached to the surface of the charged transfer belt and moving the toner to a surface of a charged metallic material to settle the toner thereon;

a fixing operation of fixing the toner settled on the surface of the metallic material;

a removal operation of removing the toner remaining on the surfaces of the photosensitive drum and the charged transfer belt after the transfer; and a discharging operation of discharging the surfaces of the photosensitive drum and the charged transfer belt, wherein a resin layer is formed on the surface of the metallic material, and the metallic material is charged by undergoing two or more charging operations of the same polarity such that the toner T attached to the transfer belt is moved and fixed to the metallic material during the transfer operation.

12. The printing method of claim 11, wherein, in the fixing operation, heating is performed to 25 to 400° C.

13. The printing method of claim 11, wherein, in the fixing operation, pressing is additionally performed.

14. The printing method of claim 11, wherein the above printing method requires two or more photosensitive drums in a case of printing using two or more toners, and performing two or more of the charging operation, the exposure operation, the developing operation, the transfer operation, and the removal operation using each photosensitive drum.

* * * * *